United States Patent
Kaita et al.

(10) Patent No.: US 7,148,299 B2
(45) Date of Patent: Dec. 12, 2006

(54) POLYMERIZATION CATALYST

(75) Inventors: Shojiro Kaita, Wako (JP); Zhaomin Hou, Wako (JP); Yasuo Wakatsuki, Wako (JP); Yoshiharu Doi, Wako (JP)

(73) Assignee: Riken, Saitama (JP)

( * ) Notice: Subject to any disclaimer, the term of this patent is extended or adjusted under 35 U.S.C. 154(b) by 0 days.

(21) Appl. No.: 10/513,686

(22) PCT Filed: May 8, 2003

(86) PCT No.: PCT/JP03/05774

§ 371 (c)(1),
(2), (4) Date: Jun. 9, 2005

(87) PCT Pub. No.: WO03/095503

PCT Pub. Date: Nov. 20, 2003

(65) Prior Publication Data

US 2005/0233894 A1    Oct. 20, 2005

(30) Foreign Application Priority Data

May 8, 2002    (JP) ............................. 2002-132993
Jan. 31, 2003    (JP) ............................. 2003-024347

(51) Int. Cl.
C08F 4/52    (2006.01)
C08F 236/10    (2006.01)

(52) U.S. Cl. ................. 526/164; 526/160; 526/134; 526/170; 526/340; 526/340.4; 526/943; 502/103; 502/152; 502/154

(58) Field of Classification Search ............... 526/160, 526/164, 134, 170, 340, 340.4, 943; 502/105, 502/152, 154
See application file for complete search history.

(56) References Cited

U.S. PATENT DOCUMENTS

| | | | |
|---|---|---|---|
| 6,596,828 B1 * | 7/2003 | Kaito et al. | .................. 526/164 |
| 2002/0119889 A1 | 8/2002 | Kaita et al. | |
| 2003/0018144 A1 | 1/2003 | Kaita et al. | |

FOREIGN PATENT DOCUMENTS

| DE | 28 48 964 A1 | 5/1980 |
|---|---|---|
| EP | 1 086 957 A1 | 3/2001 |
| EP | 1500667 A1 | 1/2005 |
| JP | 03-124706 A | 5/1991 |
| JP | 3-234709 A | 10/1991 |
| JP | 4-359002 A | 12/1992 |
| JP | 2000-313710 A | 11/2000 |
| JP | 2001-64313 A | 3/2001 |
| JP | 2002-256012 A | 9/2002 |
| WO | WO-00/52062 A1 | 9/2000 |

OTHER PUBLICATIONS

S. E. Home, Jr. et al., Industrial and Engineering Chemistry, vol. 48, No. 4, pp. 784-791 (1956).
A. Mazzei, "Structural Order in Polymers, Part A: Constitutional and Configurational Order in Synthetic Polymers and Biopolymers", Makromol. Chem., Supplement 4, pp. 61-72 (1981).
Shen et al., Journal of Polymer Science, Polymer Chemistry Edition, vol. 18, No. 12, pp. 3345-3357 (1980).
Yang Jihua et al., Scienta Sinica, vol. 23, No. 6, pp. 734-743, (1980).
Hsieh et al., Rubber Chemistry and Technology, vol. 58, No. 1, pp. 117-145 (1985).
Yang et al., Marcomolecules, vol. 15, No. 2, pp. 230-233 (1982).
Schott et al., Macromolecular Chemistry and Physics, vol. 182, No. 1, pp. 119-131 (1981).
Kaita et al., Macromolecules, vol. 32, No. 26, pp. 9078-9079 (1999).
Abstracts from SPSJ 49$^{th}$ Annual Meeting, Polymer Preprints, Japan (English Edition), vol. 49, No. 1, pp. E75 and E221 (2000).
Guangqian Yu et al., "Stereospecific Polymerization of Diolefin in the Presence of a New Type of Catalytic System Based on Cyclopentadienyl Dichlorides of the Lanthanides", Kexue Tongbao, 1984, vol. 29, No. 3, pp. 421 to 422.

* cited by examiner

*Primary Examiner*—Caixia Lu
(74) *Attorney, Agent, or Firm*—Birch, Stewart, Kolasch & Birch, LLP

(57) ABSTRACT

The present invention relates to a catalyst for polymerization of a conjugated diene or the like, which is composed of a metallocene-type cation complex of a gadolinium compound. Examples of such catalyst include a metallocene-type cation complex of a trivalent gadolinium compound represented by the general formula (I): $R_aGdX_b$ (wherein, Gd represents gadolinium; R represents a cyclopentadienyl group, a substituted cyclopentadienyl group, an indenyl group, a substituted indenyl group, a fluorenyl group, or a substituted fluorenyl group; X represents an anion; "a" represents an integer of 1 or 2; and "b" represents an integer of 1 or 2). The present invention provides a catalyst by which polymerization of a conjugated diene or copolymerization of a conjugated diene and an aromatic vinyl compound can be carried out efficiently and inexpensively.

7 Claims, 1 Drawing Sheet

POLYMERIZATION CATALYST

TECHNICAL FIELD

The present invention relates to a polymerization catalyst used for polymerization of a conjugated diene, copolymerization of a conjugated diene and an aromatic vinyl compound, or the like.

BACKGROUND ART

Various proposals have been made so far on polymerization catalysts for conjugated dienes, and the polymerization catalysts play a very important role in industrial fields. In particular, various polymerization catalysts which provide a high cis-1,4-linkage content have been studied and developed to obtain conjugated diene polymers with enhanced performance in thermal and mechanical characteristics. For example, complex catalyst systems containing as a main component a compound of a transition metal such as nickel, cobalt, and titanium are known, and some of them have already been widely used in industrial applications as polymerization catalysts for butadiene, isoprene, etc. (see Non-Patent Document 1 and Patent Document 1).

On the other hand, in order to attain a higher cis-1,4-linkage content and superior polymerization activity, complex catalyst systems which consist of a rare earth metal compound and an organometallic compound containing a group I to group III element have been studied and developed, and highly stereospecific polymerization has been studied actively (For example, see Non-Patent Documents 2–5, Patent Document 2 or the like). Among those catalyst systems, complex catalysts containing as main components a neodymium compound and an organoaluminum compound were revealed to provide a high cis-1,4-linkage content and have superior polymerization activity. The catalysts have already been used in industrial applications as polymerization catalysts for butadiene, etc. (see Non-Patent Documents 6 and 7).

With the recent progress of industrial technologies, requirements for polymeric materials as commercial products have become increasingly higher, and development of polymeric materials having still higher thermal characteristics (thermal stability, etc.) and mechanical characteristics (tensile modulus, bending modulus, etc.) has been desired strongly. As one of promising means for achieving the object, attempts have been made to produce a polymer having a high cis-1,4-configuration content in microstructure, a high molecular weight and a narrow molecular weight distribution by using a catalyst having a high polymerization activity to conjugated dienes.

For example, use of a samarocene complex as a polymerization catalyst for 1,3-butadiene and of MMAO or $AlR_3$/[$Ph_3C$][$B(C_6F_5)_4$] as a co-catalyst in combination with the catalyst is known to provide polybutadiene, which has a highly regulated 1,4-cis-configuration and a narrow molecular weight distribution, in high yields (see Non-Patent Document 8). Moreover, living polymerization has been confirmed in systems using $(C_5Me_5)_2Sm[(\mu-Me)AlMe_2(\mu-Me)]_2Sm(C_5Me_5)_2$/$Al(i-Bu)_3$/[$Ph_3C$][$B(C_6F_5)_4$] as a catalyst, and a molecular weight of the produced polymer has become controllable (see Non-Patent Document 9). In addition, the compositions disclosed in Patent Document 3 are known as catalyst compositions for polymerization.

However, the development of a production method for a conjugated diene polymer or copolymer of a conjugated diene and an aromatic vinyl compound having a higher cis 1,4-configuration content in microstructure, a high molecular weight, and a narrow molecular weight distribution and the development of a polymerization catalyst used in the production method have been desired. No isoprene polymer having a sufficiently high cis-1,4-configuration content in microstructure and a narrow molecular weight distribution has been obtained, and the development of a production method for such a polymer and the development of a polymerization catalyst used in the production method have been desired.

<Non-Patent Document 1> Ind. Eng. Chem., 48, 784, 1956

<Non-Patent Document 2> Makromol. Chem. Suppl, 4, 61, 1981

<Non-Patent Document 3> J. Polym. Sci., Polym. Chem. Ed., 18, 3345, 1980

<Non-Patent Document 4> Sci. Sinica., 2/3, 734, 1980

<Non-Patent Document 5> Rubber Chem. Technol., 58, 117, 1985

<Non-Patent Document 6> Macromolecules, 15, 230, 1982

<Non-Patent Document 7> Makromol. Chem., 94, 119, 1981

<Non-Patent Document 8> Kaita, S., et al., Macromolecules, 32, 9078, 1999

<Non-Patent Document 9> Kaita, S., et al., Polym. Prepr. Jpn., 49, 211, 2000

<Patent Document 1> JP 37-008198 B

<Patent Document 2> DE 2848964 A

<Patent Document 3> PCT/JP00/1188 Specification

DISCLOSURE OF THE INVENTION

An object of the present invention is to provide a catalyst by which polymerization of a conjugated diene or copolymerization of a conjugated diene and an aromatic vinyl compound can be carried out efficiently and inexpensively. In particular, the object of the present invention is to provide a polymerization catalyst for efficiently and inexpensively producing polymers having a high 1,4-cis-configuration content in microstructure, a high molecular weight, and a narrow molecular weight distribution.

The inventors of the present invention have conducted various intensive studies to achieve the foregoing objects. As a result, the inventors of the present invention have found out that a polymer can be produced in a extremely high efficient and inexpensive manner by carrying out polymerization of a conjugated diene or copolymerization of a conjugated diene and an aromatic vinyl compound using a metallocene-type cation complex of a gadolinium compound as a catalyst in the presence of an organoaluminum compound. In addition, the inventor of the present invention have found out that a polymer having an extremely high 1,4-cis-configuration content in microstructure, a high molecular weight, and a narrow molecular weight distribution can be produced efficiently and inexpensively by using the aforementioned catalyst. Further, the inventors of the present invention have found out that an isoprene polymer having an extremely high 1,4-cis-configuration content in microstructure and a narrow molecular weight distribution can be produced efficiently and inexpensively by using the aforementioned catalyst. The present invention was achieved on the basis of these findings.

That is, the present invention provides a catalyst for polymerization of a conjugated diene or for copolymerization of a conjugated diene and an aromatic vinyl compound, which is composed of a metallocene-type cation complex of a gadolinium compound. This catalyst has a feature in that the polymerization of a conjugated diene or the copolymerization of a conjugated diene and an aromatic vinyl compound can be efficiently preformed in the presence of an organoaluminum compound. As a preferable embodiment, the catalyst is provided in a solid state as a catalyst for the polymerization of a conjugated diene or the copolymerization of a conjugated diene and an aromatic vinyl compound. The catalyst in a solid state or in a state of a solution prepared by dissolving the complex in a solid state is added into a polymerization reaction system from the outside of the polymerization reaction system. Alternatively, as another preferable embodiment, the catalyst is formed by reacting a gadolinium compound which can form a catalyst with an ionic compound in the presence of an organoaluminum compound and is used in a polymerization reaction as a catalyst for polymerization of a conjugated diene or for copolymerization of a conjugated diene and an aromatic vinyl compound.

From another perspective, the present invention provides a production method for a polymer of conjugated dienes or a production method for a copolymer of a conjugated diene and an aromatic vinyl compound, that is, a polymerization method using a metallocene-type cation complex of a gadolinium compound in the presence of an organoaluminum compound. In a preferable embodiment, the metallocene-type cation complex is added to the polymerization reaction system in a solid state or added thereto in a state of a solution prepared by dissolving the complex in a solid state. In another preferable embodiment, the metallocene-type cation complex is formed through a reaction between a gadolinium compound which can form the metallocene-type cation complex and an ionic compound in the presence of an organoaluminum compound and then used. From still another perspective, the present invention provides the use of the metallocene-type cation complex of a gadolinium compound for polymerization of conjugated dienes or for copolymerization of a conjugated diene and an aromatic vinyl compound. From yet another perspective, the present invention provides a polymer and an isoprene polymer obtained through the method of the present invention, that is, the polymer having a cis 1,4-configuration content in microstructure of 97.0 mol % or more, a molecular weight distribution Mw/Mn of 2.00 or less, and a number average molecular weight Mn of 230,000, and the isoprene polymer having a cis 1,4-configuration content in microstructure of 97.0 mol % or more, and a molecular weight distribution Mw/Mn of 2.50 or less.

DETAILED DESCRIPTION FOR CARRYING OUT THE INVENTION

Figure 1:
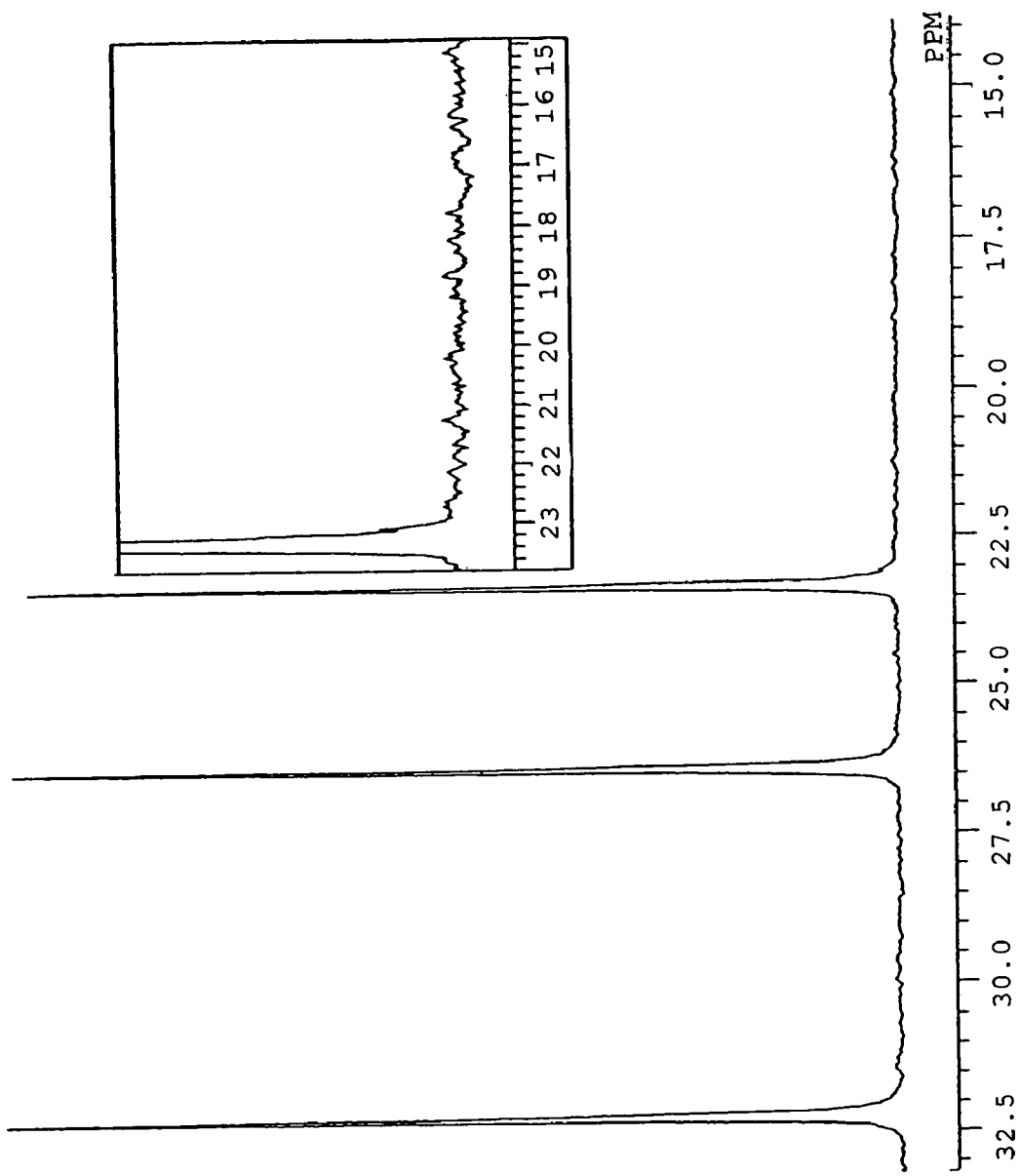
FIG. 1 is a diagram showing a $^{13}$CNMR spectrum of an isoprene polymer obtained in Example 6.

Examples of a metallocene-type cation complex of a gadolinium compound include a trivalent gadolinium compound represented by the general formula (I): $R_aGdX_b$ (wherein, Gd represents gadolinium; R represents a cyclopentadienyl group, a substituted cyclopentadienyl group, an indenyl group, a substituted indenyl group, a fluorenyl group, or a substituted fluorenyl group; X represents an anion; "a" represents an integer of 1 or 2; and "b" represents an integer of 1 or 2).

In the above general formula (I), when "a" is 2, two R's may be the same or different from each other. Similarly, when "b" is 2, two X's may be the same or different from each other.

The type, number, and substitution position of a substituent of the substituted cyclopentadienyl group, the substituted indenyl group, or the substituted fluorenyl group are not particularly limited. Examples of the substituent include a methyl group, an ethyl group, an n-propyl group, an isopropyl group, an n-butyl group, an isobutyl group, a sec-butyl group, a tert-butyl group, a hexyl group, a phenyl group, a benzyl group, and a hydrocarbon group containing a silicon atom such as a trimethylsilyl group. R may be bonded to a part of X through a crosslinking group such as a dimethylsilyl group, a dimethylmethylene group, a methylphenylmethylene group, a diphenylmethylene group, an ethylene group, and a substituted ethylene group. Two R's may be bonded to each other through a crosslinking group such as a dimethylsilyl group, a dimethylmethylene group, a methylphenylmethylene group, a diphenylmethylene group, an ethylene group, and a substituted ethylene group.

Specific examples of the substituted cyclopentadienyl group include a methylcyclopentadienyl group, a benzylcyclopentadienyl group, a vinylcyclopentadienyl group, a 2-methoxyethylcyclopentadienyl group, a trimethylsilylcyclopentadienyl group, a tert-butylcyclopentadienyl group, an ethylcyclopentadienyl group, a phenylcyclopentadienyl group, a 1,2-dimethylcyclopentadienyl group, a 1,3-dimethylcyclopentadienyl group, a 1,3-di(tert-butyl)cyclopentadienyl group, a 1,2,3-trimethylcyclopentadienyl group, a 1,2,3,4-tetramethylcyclopentadienyl group, a pentamethylcyclopentadienyl group, a 1-ethyl-2,3,4,5-tetramethylcyclopentadienyl group, a 1-benzyl-2,3,4,5-tetramethylcyclopentadienyl group, a 1-phenyl-2,3,4,5-tetramethylcyclopentadienyl group, a 1-trimethylsilyl-2,3,4,5-tetramethylcyclopentadienyl group, and a 1-trifluoromethyl-2,3,4,5-tetramethylcyclopentadienyl group. Specific examples of the substituted indenyl group include a 1,2,3-trimethylindenyl group, a heptamethylindenyl group, and a 1,2,4,5,6,7-hexamethylindenyl group.

A pentamethylcyclopentadienyl group is preferable as R.

Examples of the anion represented by X include tetra(phenyl)borate, tetrakis(monofluorophenyl)borate, tetrakis(difluorophenyl)borate, tetrakis(trifluorophenyl)borate, tetrakis(trifluorophenyl)borate, tetrakis(pentafluorophenyl)borate, tetrakis(tetrafluoromethylphenyl)borate, tetra(tolyl)borate, tetra(xylyl)borate, (triphenyl, pentafluorophenyl)borate, [tris(pentafluorophenyl), phenyl]borate, and tridecahydride-7,8-dicarbaundecaborate.

Specific examples of the metallocene-type cation complex of a gadolinium compound represented by the formula (I) include bis(pentamethylcyclopentadienyl)gadolinium tetrakis(pentafluorophenyl)borate.

The metallocene-type cation complex represented by the above formula (I) can be produced by, for example, reacting an ionic compound and a divalent or trivalent gadolinium compound represented by the general formula (II): $R_aGdY_bQY_b$ (wherein, Gd represents gadolinium; R is defined as same as R represented in the general formula (I); Y represents a hydrogen atom, a halogen atom, an alkoxide group, a thiolate group, an amide group, or a hydrocarbon group having 1 to 20 carbon atoms; Q represents a Group III element in the periodic table; "a" represents an integer of 1, 2, or 3; and "b" represents an integer of 0, 1, or 2).

In the above general formula (II), when "a" is 2 or 3, two or three R's may be the same or different from each other.

Similarly, when "b" is 1 or 2, two or four Y's may be the same or different from each other.

The reaction may be carried out by dissolving the gadolinium compound represented by the general formula (II) and the ionic compound in an inert solvent and allowing to react at 0° C. to an elevated temperature, preferably at room temperature, for 10 minutes to a few hours, preferably for about 1 hour. Of course, those reaction conditions are arbitrarily selected and may be changed. The complex of the general formula (I) without an element represented by Q is obtained in a high yield by reacting the gadolinium compound represented by the general formula (II) with two equivalents of the ionic compound. A typical example of the reaction is shown below:

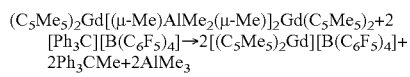

$(C_5Me_5)_2Gd[(\mu\text{-}Me)AlMe_2(\mu\text{-}Me)]_2Gd(C_5Me_5)_2 + 2[Ph_3C][B(C_6F_5)_4] \rightarrow 2[(C_5Me_5)_2Gd][B(C_6F_5)_4] + 2Ph_3CMe + 2AlMe_3$ The reaction can be carried out under an atmosphere of an inert gas such as nitrogen or argon in an inert solvent. The type of the inert solvent is not particularly limited, and examples of the inert solvent that can be used include: saturated aliphatic hydrocarbons such as butane, pentane, hexane, and heptane; saturated cycloaliphatic hydrocarbons such as cyclopentane and cyclohexane; monoolefins such as 1-butene and 2-butene; aromatic hydrocarbons such as benzene and toluene; and halogenated hydrocarbons such as methylene chloride, chloroform, carbon tetrachloride, trichloroethylene, perchloroethylene, 1,2-dichloroethane, chlorobenzene, bromobenzene, and chlorotoluene. Of those, toluene is preferred. Two or more solvents may be used in combination. The resulting complex of the general formula (I) can be taken out of a complex formation reaction system as a solid through a common separation operation. In general, the complex having a practically sufficient purity can be obtained by distilling off a reaction solvent, washing the target product obtained as a residue with an inert solvent, and drying the product under reduced pressure.

Further, by carrying out the reaction in the presence of an organoaluminum compound to form a sufficient amount of the catalyst, the complex represented by the general formula (I) may be used as a catalyst even in a state of existing in the reaction solution in which it is formed. Examples of the conditions for forming a sufficient amount of the catalyst include a reaction at room temperature for 1 or more hours. An amount of the organoaluminum compound used needs to be about 15 equivalents for the expected amount of the complex represented by the general formula (I) theoretically formed. Note that, when the catalyst existing in the formed reaction solution is used for the polymerization reaction, an inert solvent used for a formation reaction of the catalyst, which is also a suitable solvent for the polymerization reaction, is preferable from the view point of saving efforts of solvent exchange, or the like.

In the above general formula (II), R is defined as same as R represented in the general formula (I) and represents a cyclopentadienyl group, a substituted cyclopentadienyl group, an indenyl group, a substituted indenyl group, a fluorenyl group, or a substituted fluorenyl group. The type, number, and substitution position of a substituent, the presence or absence of a crosslink, and preferable specific examples of R are the same as those given above. Note that, the R in the general formula (II) may be selected arbitrarily depending on the target catalyst represented by the general formula (I).

The alkoxide group represented by Y may be any of: an aliphatic alkoxy group such as a methoxy group, an ethoxy group, a propoxy group, an n-butoxy group, an isobutoxy group, a sec-butoxy group, or a tert-butoxy group; and an aryl oxide group such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, or a 2-isopropyl-6-neopentylphenoxy group. Of those, a 2,6-di-tert-butylphenoxy group is preferred.

The thiolate group represented by Y may be any of: an aliphatic thiolate group such as a thiomethoxy group, a thioethoxy group, a thiopropoxy group, a thio-n-butoxy group, a thioisobutoxy group, a thio-sec-butoxy group, or a thio-tert-butoxy group; and an aryl thiolate group such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, or a 2,4,6-triisopropylthiophenoxy group. Of those, a 2,4,6-triisopropylthiophenoxy group is preferred.

The amide group represented by Y may be any of: an aliphatic amide group such as a dimethylamide group, a diethylamide group, or a diisopropylamide group; and an arylamide group such as a phenylamide group, a 2,6-di-tert-butylphenylamide group, a 2,6-diisopropylphenylamide group, a 2,6-dineopentylphenylamide group, a 2-tert-butyl-6-isopropylphenylamide group, a 2-tert-butyl-6-neopentylphenylamide group, a 2-isopropyl-6-neopentylphenylamide group, or a 2,4,6-tert-butylphenylamide group. Of those, a 2,4,6-tert-butylphenylamide group is preferred.

The halogen atom represented by Y may be any of a fluorine atom, a chlorine atom, a bromine atom, and an iodine atom. Of those, a chlorine atom and an iodine atom are preferred.

Specific examples of the hydrocarbon group having 1 to 20 of carbon atoms represented by Y include: straight-chain or branched aliphatic hydrocarbon groups such as a methyl group, an ethyl group, an n-propyl group, an isopropyl group, an n-butyl group, an isobutyl group, a sec-butyl group, a tert-butyl group, a neopentyl group, a hexyl group, and an octyl group; aromatic hydrocarbon groups such as a phenyl group, a tolyl group, and a naphthyl group; aralkyl groups such as a benzyl group; and hydrocarbon groups each containing a silicon atom such as a trimethylsilylmethyl group and a bistrimethylsilylmethyl group. Of those, a methyl group, an ethyl group, an isobutyl group, and a trimethylsilylmethyl group are preferred.

As Y, a hydrogen atom, a halogen atom, or a hydrocarbon group having 1 to 20 carbon atoms is preferred.

Q represents a Group III element in the periodic table. Specific examples of such an element include boron, aluminum, and gallium. Of those, aluminum is preferred.

Specific examples of the metallocene-type cation complex of a gadolinium compound represented by the formula (II) include dimethylaluminum(μ-dimethyl)bis(pentamethylcyclopentadienyl)gadolinium.

Any ionic compound may be used as long as the ionic compound is composed of a non-coordinating anion and a cation and can react with the gadolinium compound represented by the above formula (II) to form the complex of the above formula (I). Examples of the non-coordinating anion include tetra(phenyl)borate, tetrakis(monofluorophenyl)borate, tetrakis(difluorophenyl)borate, tetrakis(trifluorophenyl)borate, tetrakis(trifluorophenyl)borate, tetrakis(pentafluorophenyl)borate, tetrakis(tetrafluoromethylphenyl)borate, tetra(tolyl)borate, tetra(xylyl)borate, (triphenyl, pentafluorophenyl)borate, [tris(pentafluorophenyl), phenyl] borate, and tridecahydride-7,8-dicarbaundecaborate.

Examples of the cation include a carbonium cation, an oxonium cation, an ammonium cation, a phosphonium cation, a cycloheptatrienyl cation, and a ferrocenium cation containing a transition metal. Specific examples of the carbonium cation include trisubstituted carbonium cations such as a triphenylcarbonium cation and a trisubstituted phenylcarbonium cation. Specific examples of the trisubstituted phenylcarbonium cation include a tri(methylphenyl)carbonium cation and a tri(dimethylphenyl)carbonium cation. Specific examples of the ammonium cation include: trialkylammonium cations such as a trimethylammonium cation, a triethylammonium cation, a tripropylammonium cation, a tributylammonium cation, and a tri(n-butyl)ammonium cation; N,N-dialkylanilinium cations such as an N,N-diethylanilinium cation and an N,N-2,4,6-pentamethylanilinium cation; and dialkylammonium cations such as a di(isopropyl)ammonium cation and a dicyclohexylammonium cation. Specific examples of the phosphonium cation include triarylphosphonium cations such as a triphenylphosphonium cation, a tri(methylphenyl)phosphonium cation, and a tri(dimethylphenyl)phosphonium cation.

A combination of an arbitrarily selected non-coordinating anion and an arbitrarily selected cation may preferably be used as an ionic compound. Preferable examples of the ionic compound include triphenylcarbonium tetrakis(pentafluorophenyl)borate, triphenylcarbonium tetrakis(tetrafluorophenyl)borate, N,N-dimethylanilinium tetrakis(pentafluorophenyl)borate, and 1,1'-dimethylferrocenium tetrakis (pentafluorophenyl)borate. The ionic compound may be used alone, or two or more of them may be used in combination. Examples of a Lewis acid that react with a transition metal compound to form a cationic transition metal compound include $B(C_6F_5)_3$ and $Al(C_6F_5)_3$. The acid may be used in combination with the aforementioned ionic compound.

The catalyst of the present invention can be used for the polymerization of conjugated dienes or for the copolymerization of a conjugated diene and an aromatic vinyl compound. An amount of the catalyst of the present invention added is usually about the same as that of any general catalyst.

The catalyst of the present invention can be used for the polymerization of conjugated dienes or for the copolymerization of a conjugated diene and an aromatic vinyl compound in the presence of an organoaluminum compound. Examples of the organoaluminum compound include trialkylaluminum such as trimethylaluminum, triethylaluminum, or triisobutylaluminum, and mixtures thereof. Triisobutylaluminum is particularly preferred. A mixture of trimethylaluminum and tributylaluminum may be used. When the complex formed in the presence of the organoaluminum compound is used directly for reaction, the amount of the organoaluminum compound used is the same as that described above. The amount of the organoaluminum compound used is not particularly limited for the complex added to the polymerization reaction system in a solid state or for the complex added to the polymerization reaction system as a solution prepared by dissolving the complex in a solid state. For example, two or more equivalents of the organoaluminum compound for the complex represented by the formula (I) may be used, more preferably about two equivalents of the organoaluminum compound is used.

The type of a conjugated diene compound monomer that can be polymerized through the production method for a polymer of present invention is not particularly limited. Examples of the monomer include 1,3-butadiene, isoprene, 1,3-pentadiene, 2-ethyl-1,3-butadiene, 2,3-dimethylbutadiene, 2-methylpentadiene, 4-methylpentadiene, and 2,4-hexadiene. Of those, 1,3-butadiene and isoprene are preferred. The monomer components may be used alone, or two or more of them may be used in combination. The type of an aromatic vinyl compound monomer that can be copolymerized by through the production method for a polymer of present invention is not particularly limited. Examples of the monomer include styrene, p-methylstyrene, m-methylstyrene, p-tert-butylstyrene, a-methylstyrene, chloromethylstyrene, p-tert-butoxystyrene, dimethylaminomethylstyrene, dimethylaminoethylstyrene, and vinyltoluene. Of those, styrene is preferred. The monomer components may be used alone, or two or more of them may be used in combination.

As a preferable embodiment of the production method for a polymer of the present invention, a homopolymer may be obtained by polymerizing one type of the conjugated diene compound monomer. Specific examples of such a homopolymer include a 1,3-butadiene homopolymer and an isoprene homopolymer.

The production method for a polymer of the present invention may be carried out either in the presence or absence of a solvent. Where a solvent is used, the type of the solvent is not particularly limited as long as the solvent is substantially inactive in the polymerization reaction and has sufficient solubility of the monomer and the catalyst composition. Examples of the solvent include: saturated aliphatic hydrocarbons such as butane, pentane, hexane, and heptane; saturated cycloaliphatic hydrocarbons such as cyclopentane and cyclohexane; monoolefins such as 1-butene and 2-butene; aromatic hydrocarbons such as benzene and toluene; halogenated hydrocarbons such as methylene chloride, chloroform, carbon tetrachloride, trichloroethylene, perchloroethylene, 1,2-dichloroethane, chlorobenzene, bromobenzene, and chlorotoluene. Of those, toluene is preferred. Two or more solvents may be used in combination.

A polymerization temperature in the production method for a polymer of the present invention may be in the range of from −100° C. to 100° C., preferably in the range of from −50° C. to 80° C., more preferably 0° C. or lower, for example. A polymerization time may be about 1 minute to 12 hours, preferably about 5 minutes to 5 hours, for example. Of course, those reaction conditions may be selected arbitrarily depending on the type of the monomer and the type of the catalyst, and are not limited to the ranges exemplified above. After the polymerization reaction reaches a predetermined polymerization degree, the reaction may be stopped by adding a known polymerization terminator to the polymerization system. Then, a produced polymer may be separated from the polymerization reaction system in a conventional manner.

A preferable embodiment of the production method for a polymer of the present invention involves: adding the catalyst of the general formula (I) in a solid state to the polymerization reaction system; further adding an organoaluminum compound; and then introducing a monomer into the polymerization reaction system. Alternatively, the catalyst may be added to the polymerization reaction system as a solution prepared following a general method involving dissolving the catalyst of the general formula (I) in a solid state. Of course, the order of adding the catalyst, organoaluminum compound, and reactant monomer may be arbitrarily changed. A preferable embodiment of the production method for a polymer of the present invention enables polymerization by introducing the catalyst of the general formula (I) in a solid state which is obtained in advance by reacting a gadolinium compound represented by the general formula (II) with an ionic compound outside the polymerization reaction system, or a solution prepared by dissolving the catalyst into the polymerization reaction system. Thus, a reaction cost is reduced, thereby enabling efficient polymerization. For example, the catalyst of the general formula (I) of the present invention, which is obtained by reacting the gadolinium compound represented by the above general formula (II): $R_aGdY_bQY_b$ with the ionic compound, contains no element of Q or no compound derived from the element Q. Thus, the production method for a polymer of the present invention has an advantage from the viewpoint of the cost compared to the conventional method involving polymerization by introducing three types of reactants, i.e., the compound represented by the above general formula (II), the ionic compound, and the organoaluminum compound, into the polymerization reaction system. In addition, the production method for a polymer of the present invention involves less numbers of reactants participating in the reaction. As a result, the reaction can be easily controlled and efficient and inexpensive polymerization can be attained.

Further, another preferable embodiment of the production method for a polymer of the present invention involves: reacting a gadolinium compound which can form a catalyst with an ionic compound in the presence of an organoaluminum compound in the polymerization reaction system to form a catalyst; and introducing a monomer into the polymerization reaction system. Alternatively, the production method involves: reacting a gadolinium compound which can form a catalyst with an ionic compound in the presence of an organoaluminum compound outside the polymerization reaction system to form a catalyst; adding the catalyst to the polymerization reaction system; and introducing a monomer into the polymerization reaction system. Of course, when the catalyst is added from the outside of the polymerization reaction system, the order of adding the catalyst and the reactant monomer can be arbitrarily changed. Note that, such a technique is enabled by reacting the compounds in the presence of an organoaluminum compound and adjusting a reaction time and a temperature in the course of catalyst preparation. To be specific, such a technique is enabled by reacting a solution of a catalyst raw material in the presence of an organoaluminum compound at room temperature for 1 or more hours. Such an embodiment of the production method for a polymer of the present invention is advantageous in that the catalyst formed need not be isolated in a solid state, and thus one step is omitted.

The polymer obtained through the method of the present invention has a 1,4-cis-configuration content in microstructure of generally 80.0 mol % or more, preferably 90.0 mol % or more, more preferably 95.0 mol % or more, particularly preferably 98.0 mol % or more, further more preferably 99.0 mol % or more, most preferably about 100 mol %. The polymer has a molecular weight distribution Mw/Mn of 2.50 or less, preferably 2.20 or less, more preferably 2.00 or less, further more preferably 1.90 or less, particularly preferably 1.80 or less. The polymer has a number average molecular weight Mn of 100,000 or more, preferably 150,000 or more, more preferably 200,000 or more, further more preferably 230,000 or more, particularly preferably 240,000 or more. The polymer obtained through the method of the present invention has excellent characteristics such as an extremely high 1,4-cis-configuration content in microstructure, a high molecular weight, and a narrow molecular weight distribution. The isoprene polymer obtained through the method of the present invention has excellent characteristics such as an extremely high 1,4-cis-configuration content in microstructure and a narrow molecular weight distribution. The more preferable embodiment of the isoprene polymer obtained through the method of the present invention has excellent characteristics such as an extremely high 1,4-cis-configuration content in microstructure, a high molecular weight, and a narrow molecular weight distribution. The polymer obtained through the method of the present invention is expected to have superior thermal characteristics (thermal stability and the like) and mechanical characteristics (tensile modulus, bending modulus, and the like), and thus can be used for various applications as a polymeric material.

The polymer obtained through the method of the present invention has a high cis-configuration content in microstructure and has enhanced performance in thermal and mechanical characteristics. An improvement in a cis-configuration content of mere several % is very significant in industrial production of polymers.

Further, the polymer obtained through the method of the present invention has a characteristic of hardly containing proteins, and thus is advantageous in that the polymer may be used for low-protein rubber materials.

EXAMPLES

Hereinafter, the present invention will be explained more specifically with reference to examples. However, the scope of the present invention is not limited to the examples. A microstructure of polybutadiene referred to in the examples was calculated from integration ratios of peaks observed by $^1$H NMR and $^{13}$C NMR [$^1$H NMR: δ 4.8–5.0 (=CH$_2$ of 1,2-vinyl unit), 5.2–5.8 (—CH= of 1,4-unit and —CH= of 1,2-vinyl unit), $^{13}$C NMR: δ 27.4 (1,4-cis unit), 32.7 (1,4-trans unit), 127.7–131.8 (1,4-unit), 113.8–114.8 and 143.3–144.7 (1,2-vinyl unit)]. A microstructure of polyisoprene was calculated from integration ratios of peaks observed by $^{13}$C NMR [δ 23.4 (1,4-cis unit), 15.9 (1,4-trans unit), and 18.6 (3,4-unit)]. A weight average molecular weight (Mw), a number average molecular weight (Mn), and a molecular weight distribution (Mw/Mn) were determined by GPC using polystyrene as a standard reference material.

Example 1

In a glove box under nitrogen atmosphere, 0.02 mmol of bis(pentamethylcyclopentadienyl)gadolinium tetrakis (pentafluorophenyl)borate [(Cp*)$_2$Gd][B(C$_6$F$_5$)$_4$] (Cp*: pentamethylcyclopentadienyl ligand) was placed into a sufficiently dried 30-ml pressure-resistant glass bottle, and dissolved in 10 ml of toluene. Then, 0.10 mmol of triisobutylaluminum was added, and the bottle was sealed with a stopper. The bottle was then taken out from the glove box, and 0.54 g of 1,3-butadiene was placed into the bottle, for polymerization at 50° C. for 3 minutes. After the polymerization, 10 ml of a 10 wt % methanol solution of BHT [2,6-bis(t-butyl)-4-methylphenol] was added to stop the reaction. The polymer was separated by using a large amount of a methanol/hydrochloric acid mixed solvent, and dried at 60° C. in vacuo. An yield of the resulting polymer was 100 wt %. A cis-content in microstructure of the polymer was 97.3 mol %. A number average molecular weight was 245,000, and Mw/Mn was 1.73.

Example 2

An experiment was conducted in the same manner as in Example 1 except that the polymerization was carried out at 30° C. for 5 minutes. The yield of the resulting polymer was 100 wt %. The cis-content in microstructure of the polymer was 98.5 mol %. The number average molecular weight was 261,400, and Mw/Mn was 1.52.

Example 3

An experiment was conducted in the same manner as in Example 1 except that the polymerization was carried out at 0° C. for 10 minutes. The yield of the resulting polymer was 91 wt %. The cis-content in microstructure of the polymer was 99.0 mol %. The number average molecular weight was 300,500, and Mw/Mn was 1.45.

Example 4

An experiment was conducted in the same manner as in Example 1 except that the polymerization was carried out at −20° C. for 30 minutes. The yield of the resulting polymer was 93 wt %. The cis-content in microstructure of the polymer was 99.7 mol %. The number average molecular weight was 405,000, and Mw/Mn was 1.41.

Example 5

An experiment was conducted in the same manner as in Example 1 except that the polymerization was carried out at −40° C. for 150 minutes. The yield of the resulting polymer was 92 wt %. The cis-content in microstructure of the polymer was 99.8 mol %. The number average molecular weight was 501,600, and Mw/Mn was 1.57.

Example 6

In a glove box under nitrogen atmosphere, 0.05 mmol of dimethylaluminum(μ-dimethyl)bis(pentamethylcyclopentadienyl)gadolinium [(Cp*)$_2$Gd(μ-Me)$_2$AlMe$_2$] was place into a sufficiently dried 100-ml pressure-resistant glass bottle, and dissolved in 34.0 ml of toluene. Then, 1.5 mmol of triisobutylaluminum and 0.05 mmol triphenylcarbonium tetrakis(pentafluorophenyl)borate (Ph$_3$CB(C$_6$F$_5$)$_4$) were added, and the bottle was sealed with a stopper. After the reaction at room temperature for 1 hour, the bottle was taken out from the glove box, and 1.0 ml of isoprene was placed into the bottle for polymerization at −40° C. for 15 hours.

After the polymerization, 10 ml of a 10 wt % methanol solution of BHT [2,6-bis(t-butyl)-4-methylphenol] was added to stop the reaction. The polymer was separated by using a large amount of a methanol/hydrochloric acid mixed solvent, and dried at 60° C. in vacuo. The yield of the resulting polymer was 100 wt %. The cis-content in microstructure of the polymer was 100.0 mol %. The number average molecular weight was 1,281,600, and Mw/Mn was 1.75.

Example 7

An experiment was conducted in the same manner as in Example 6 except that 0.5 mmol of triisobutylaluminum was added, and the polymerization was carried out at −20° C. for 2.5 hours. The yield of the resulting polymer was 93 wt %. The cis-content in microstructure of the polymer was 99.4 mol %. The trans-content was 0.0 mol %. The 3,4-content was 0.6 mol %. The number average molecular weight was 931,100, and Mw/Mn was 1.99.

Comparative Example 1

An experiment was conducted in the same manner as in Example 1 except that bis(pentamethylcyclopentadienyl) samarium tetrakis(pentafluorophenyl)borate [(CP*)$_2$Sm][B(C$_6$F$_5$)$_4$] was used in place of [(CP*)$_2$Gd][B(C$_6$F$_5$)$_4$]. The yield of the resulting polymer was 94 wt %. The cis-content in microstructure of the polymer was 96.9 mol %. The number average molecular weight was 148,300, and Mw/Mn was 1.42.

Comparative Example 2

An experiment was conducted in the same manner as in Example 1 except that bis(pentamethylcyclopentadienyl) neodymium tetrakis (pentafluorophenyl)borate [(CP*)$_2$Nd][B(C$_6$F$_5$)$_4$] was used in place of [(CP*)$_2$Gd][B(C$_6$F$_5$)$_4$]. The yield of the resulting polymer was 96 wt %. The cis-content in microstructure of the polymer was 91.3 mol %. The number average molecular weight was 129,800, and Mw/Mn was 1.37.

Comparative Example 3

An experiment was conducted in the same manner as in Example 1 except that bis(pentamethylcyclopentadienyl) praseodymium tetrakis (pentafluorophenyl)borate [(CP*)$_2$Pr][B(C$_6$F$_5$)$_4$] was used in place of [(CP*)$_2$Gd][B(C$_6$F$_5$)$_4$]. The yield of the resulting polymer was 95 wt %. The cis-content in microstructure of the polymer was 89.4 mol %. The number average molecular weight was 75,700 and Mw/Mn was 1.65.

Comparative Example 4

An experiment was conducted in the same manner as in Example 2 except that bis(pentamethylcyclopentadienyl) samarium tetrakis (pentafluorophenyl)borate [(Cp*)$_2$Sm][B(C$_6$F$_5$)$_4$] was used in place of [(CP*)$_2$Gd][B(C$_6$F$_5$)$_4$]. The yield of the resulting polymer was 100 wt %. The cis-content in microstructure of the polymer was 97.3 mol %. The number average molecular weight was 108,400, and Mw/Mn was 1.51.

Comparative Example 5

An experiment was conducted in the same manner as in Example 3 except that bis(pentamethylcyclopentadienyl) samarium tetrakis (pentafluorophenyl)borate [(CP*)$_2$Sm][B(C$_6$F$_5$)$_4$] was used in place of [(CP*)$_2$Gd][B(C$_6$F$_5$)$_4$]. The yield of the resulting polymer was 82 wt %. The cis-content in microstructure of the polymer was 99.0 mol %. The number average molecular weight was 161,400, and Mw/Mn was 1.48.

Comparative Example 6

An experiment was conducted in the same manner as in Example 4 except that bis(pentamethylcyclopentadienyl) samarium tetrakis (pentafluorophenyl)borate [(Cp*)$_2$Sm][B(C$_6$F$_5$)$_4$] was used in place of [(Cp*)$_2$Gd][B(C$_6$F$_5$)$_4$]. The yield of the resulting polymer was 91 wt %. The cis-content in microstructure of the polymer was 99.3 mol %. The number average molecular weight was 223,800, and Mw/Mn was 1.35.

INDUSTRIAL APPLICABILITY

Use of the catalyst of the present invention allows efficient and inexpensive production of a polymer having an extremely high content of 1,4-cis-configuration in microstructure, a high molecular weight, and a narrow molecular weight distribution.

The invention claimed is:

1. A catalyst for polymerization of a conjugated diene or for copolymerization of a conjugated diene and an aromatic vinyl compound, which is composed of a metallocene-type cation complex of a gadolinium compound, wherein the metallocene-type cation complex is a metallocene-type cation complex of a trivalent gadolinium compound represented by the general formula (I): $R_a GdX_b$ wherein, Gd represents gadolinium; R represents a cyclopentadienyl group, a substituted cyclopentadienyl group, an indenyl group, a substituted indenyl group, a fluorenyl group, or a substituted fluorenyl group; X represents an anion; "a" represents an integer of 1 or 2; and "b" represents an integer of 1 or 2.

2. The catalyst according to claim 1, which is used for polymerization in the presence of an organoaluminum compound.

3. A production method for a polymer of conjugated dienes or for a copolymer of a conjugated diene and an aromatic vinyl compound, comprising carrying out polymerization in the presence of the metallocene-type cation complex of a gadolinium compound according to claim 1 and an organoaluminum compound.

4. The production method according to claim 3, comprising adding the metallocene-type cation complex in a solid state into a polymerization reaction system, or adding a solution prepared by dissolving the metallocene-type cation complex in a solid state into the polymerization reaction system.

5. The production method according to claim 3, comprising reacting a gadolinium compound which can form the metallocene-type cation complex with an ionic compound in the presence of an organoaluminum compound to form the metallocene-type cation complex.

6. A production method for a polymer of one or more conjugated dienes or of a conjugated diene and an aromatic vinyl compound comprising polymerizing said conjugated diene(s) or conjugated diene and aromatic vinyl compound in the presence of the metallocene-type cation complex of claim 1 and an organoaluminum compound, wherein the polymer that is produced has a microstructure cis-1,4 configuration content of 97 mol % or more, a molecular weight distribution Mw/Mn of 2.00 or less and a number average molecular weight Mn of 230,000 or more.

7. A production method for an isoprene polymer of conjugated dienes comprising polymerizing said conjugated dienes in the presence of the metallocene-type cation complex of claim 1 and an organoaluminum compound, wherein the isoprene polymer that is produced has a microstructure cis-1,4 configuration content of 97 mol % or more, a molecular weight distribution Mw/Mn of 2.50 or less.

* * * * *